May 23, 1950 T. M. SEARLES 2,508,842
COTTON PICKER SPINDLE
Filed Aug. 20, 1945 5 Sheets-Sheet 3
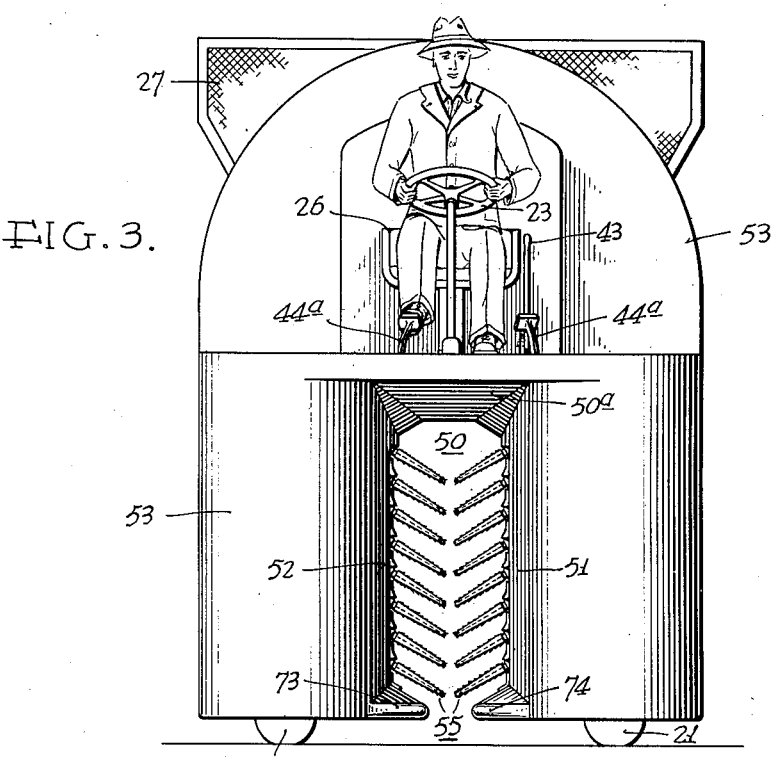
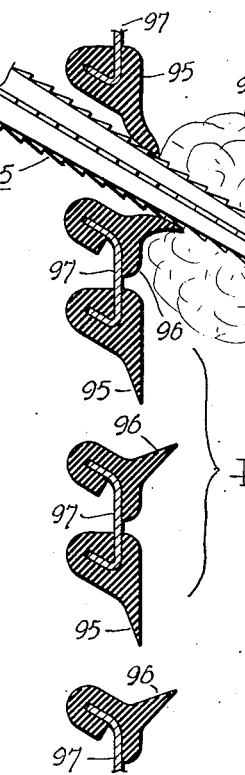
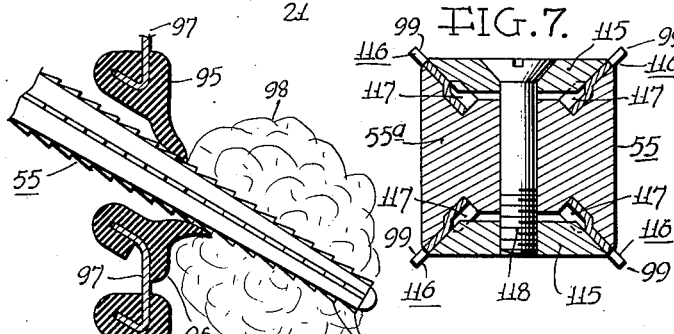
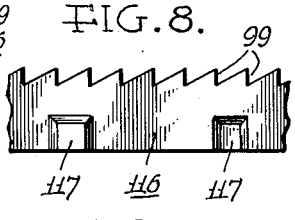
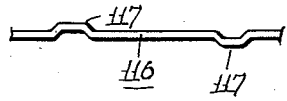
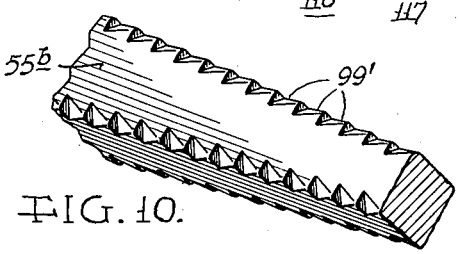
Inventor —
Thomas M. Searles
by his Attorneys
Howson & Howson May 23, 1950

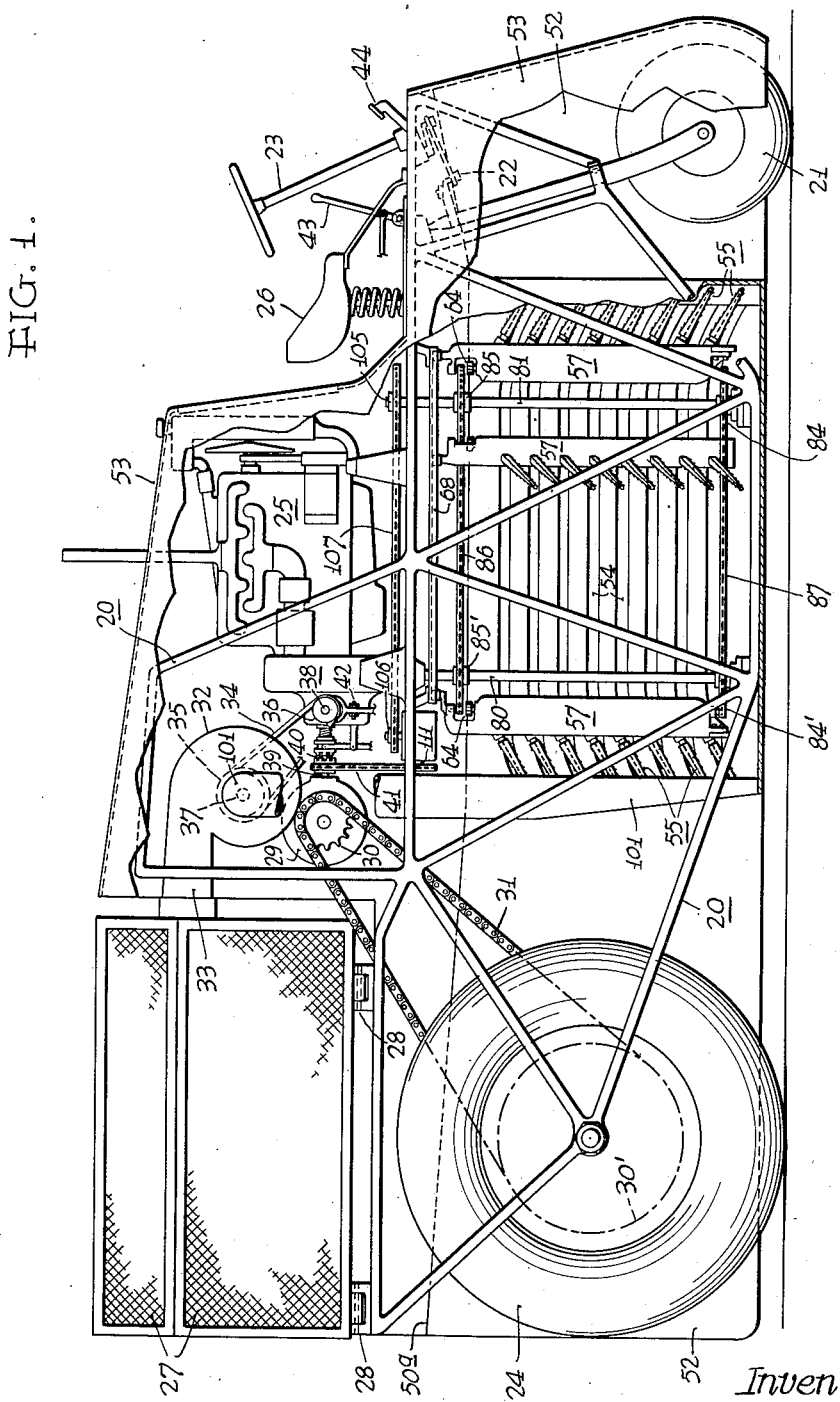

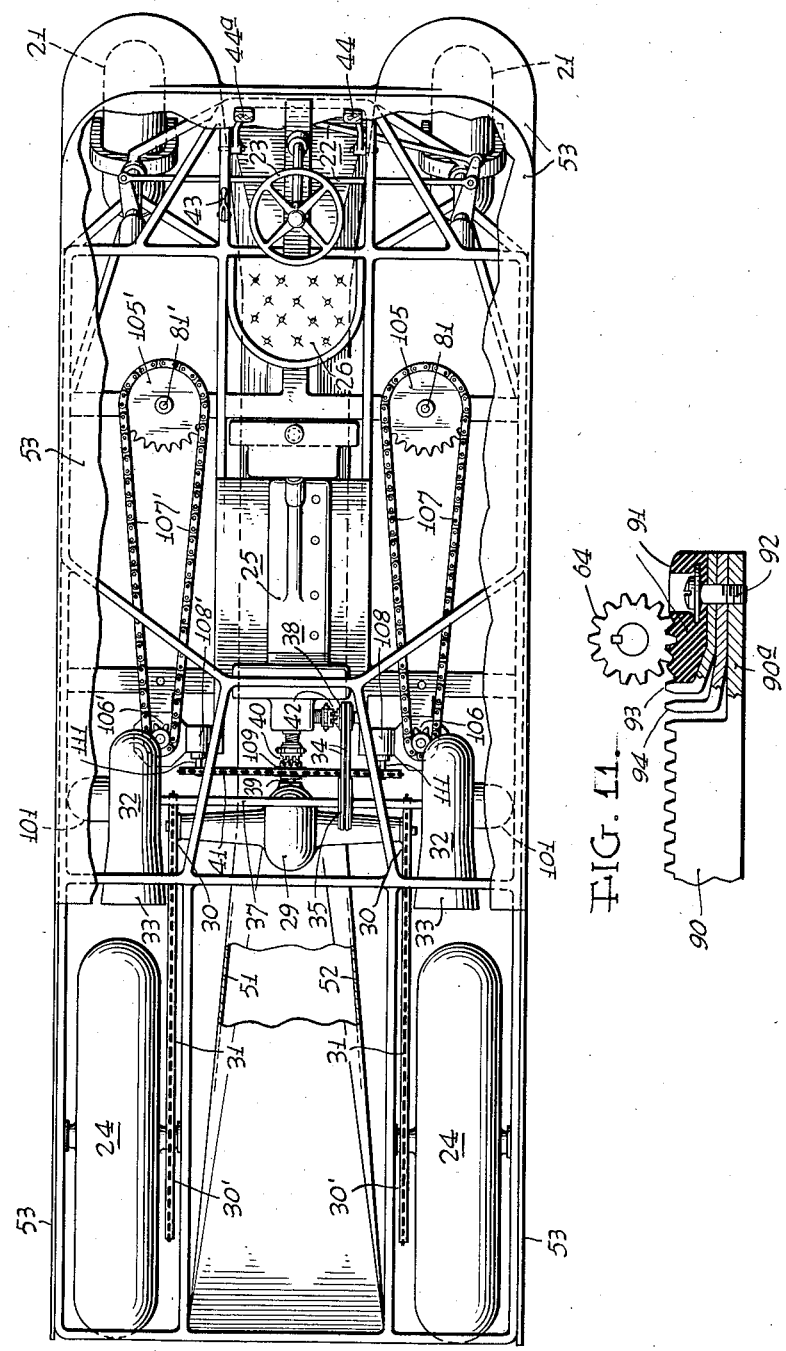

T. M. SEARLES 2,508,842

COTTON PICKER SPINDLE

Filed Aug. 20, 1945

Inventor ÷
Thomas M. Searles
by his Attorneys
Howson & Howson

May 23, 1950

T. M. SEARLES 2,508,842

COTTON PICKER SPINDLE

Filed Aug. 20, 1945

Inventor:
Thomas M. Searles
by his Attorneys
Howson & Howson

Patented May 23, 1950

2,508,842

UNITED STATES PATENT OFFICE 2,508,842

COTTON PICKER SPINDLE

Thomas M. Searles, Memphis, Tenn.

Application August 20, 1945, Serial No. 611,542

5 Claims. (Cl. 56—50)

This invention relates to improvements in cotton pickers, specifically of the type wherein the cotton staple is removed from the plant by contact with rotating fingers.

An object of this invention is to provide a picking mechanism which is self-contained, requiring neither separate motive power nor vehicle to receive the harvested crop. A second object is to provide a mechanism which is simple in construction and easily maintained. A third object is to provide a picker which will remove substantially all ripe and open staple on the plants, while avoiding to the greatest possible degree the contamination of the staple with leaf and boll trash. A fourth object is to provide a picker which is rapid, equaling the work of a great number of human pickers.

Further objects will be apparent from the specification and drawings in which:

Fig. 1 is a side elevation of a cotton picker constructed in accordance with the invention with the outside cover partly broken away;

Fig. 2 is a plan of the structure of Fig. 1 with the covers suitably broken away to disclose the operating mechanism of the picker;

Fig. 3 is a front elevation of the cotton picker;

Fig. 6 is an enlarged fragmentary view showing one of the fingers progressing through the doffers as seen in the position at 8—8 of Fig. 4;

Fig. 7 is an enlarged cross section of one picker finger;

Fig. 8 is an enlarged fragmentary detail of one of the finger blades;

Fig. 9 is a bottom view of the structure of Fig. 8;

Fig. 10 is a perspective of a modified form of picker finger; and

Fig. 11 is a fragmentary detail showing the engaging device for the finger spindle drive shaft gear and the driving rack.

Figure 4:
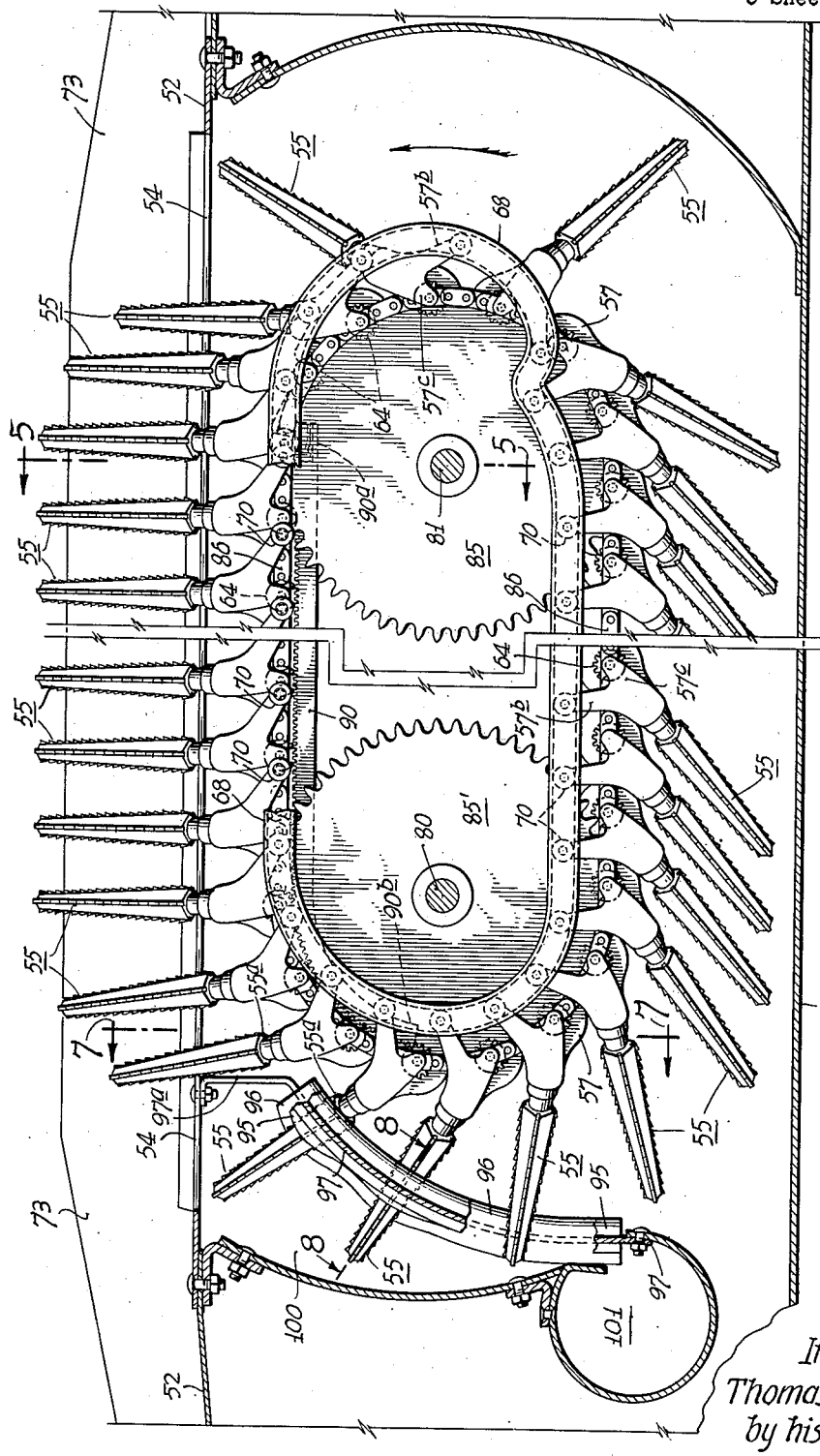
Fig. 4 is an enlarged detail in plan showing one of the picker assemblies.

My cotton picker comprises essentially the provision of a light weight tubular frame having a pair of driving wheels mounted at the rear of the frame and a pair of castered steering wheels at the forward end of the frame. A standard internal combustion engine is mounted centrally at the top of the frame, and is adapted to drive the picker mechanism, a pair of blowers and also to provide propelling force for the driving wheels. A tunnel extends longitudinally through the center of the picker, and a series of vertically arranged rotatable picking fingers enter the tunnel at the front to engage the cotton plants. As the fingers reach the rear of the tunnel, they are drawn through a series of wipers or doffers which disengage the cotton fibre from the fingers whereupon the cotton is carried into a large container mounted on the frame.

The features of especial importance in my picker reside in the details of the construction and operation of the picker fingers. First, in the preferred form, it is never necessary to remove the fingers themselves since they are provided with blades which may be readily replaced in service. Second, adjacent vertically disposed fingers in each bank are counter-rotating, and it has been found that such counter-rotation greatly increases the picking efficiency. A third and further important feature resides in the fact that the finger carriers are pivoted on a vertical axis so that a minimum width for the picker may be achieved, this feature enables the cotton rows to be more closely planted which in turn increases the yield per acre.

Referring now more particularly to Figs. 1 and 2 of the drawings, the picker is constructed of a tubular frame designated generally at 20 on which is mounted a pair of front steering wheels 21, 21, which are actuated by a conventional steering linkage 22 and steering wheel 23. The driving wheels 24 are journaled at the rear of frame 20 and are driven by a conventional internal combustion engine 25 mounted on the top of frame member 20 directly in back of the operator's seat 26. A wire mesh basket 27 is mounted on the frame 20 over the driving wheels 24 and may be pivoted at 28, 28 to enable convenient emptying thereof. A jackshaft housing 29 is mounted in back of motor 25 and is provided with a standard differential (not shown), and a pair of sprockets 30, 30 through which wheels 24, 24 are driven by means of chains 31, 31, and sprockets 30', 30'.

A pair of blowers 32, 32 are positioned on the frame substantially over sprockets 30, 30 and are adapted to discharge into basket 27 through pipes 33, 33. Drive for the blowers is by means of a belt 34 connecting pulleys 35 and 36 on blower shaft 37 and power takeoff 38 respectively. The drive shaft 39 of motor 25 is provided with a toothed clutch assembly 40 adapted to selectively drive the picker mechanism through chain 41. Both clutch 40 and the power takeoff clutch 42 are actuated by means of convenient control lever 43 at the driver's position. Conventional clutch and brake pedals 44 and 44a may also be supplied if desired. It will be understood that the general frame assembly, power and control devices of the picker are more or less conventional but the entire arrangement is such that great saving in weight may be accomplished by utilizing welded tubular frame construction together with the proper relative positioning of the various parts.

The cotton picking mechanism as distinguished from the driving and control mechanism just described, forms a most important feature of the invention. The picker is provided with a narrow tunnel which extends from front to rear of the picker along the center line thereof. In effect, the sides of the tunnel are formed from sheet metal guards 51 and 52 which extend forwardly around the steering wheels and enclose the entire picker as shown in Fig. 3. The top of the picker, with the exception of basket 27, is enclosed by means of a hood or guard 53. It will be readily understood that the sheet metal guards are made in convenient sections so that any desired part thereof may be removed for inspection or service.

Figure 5:
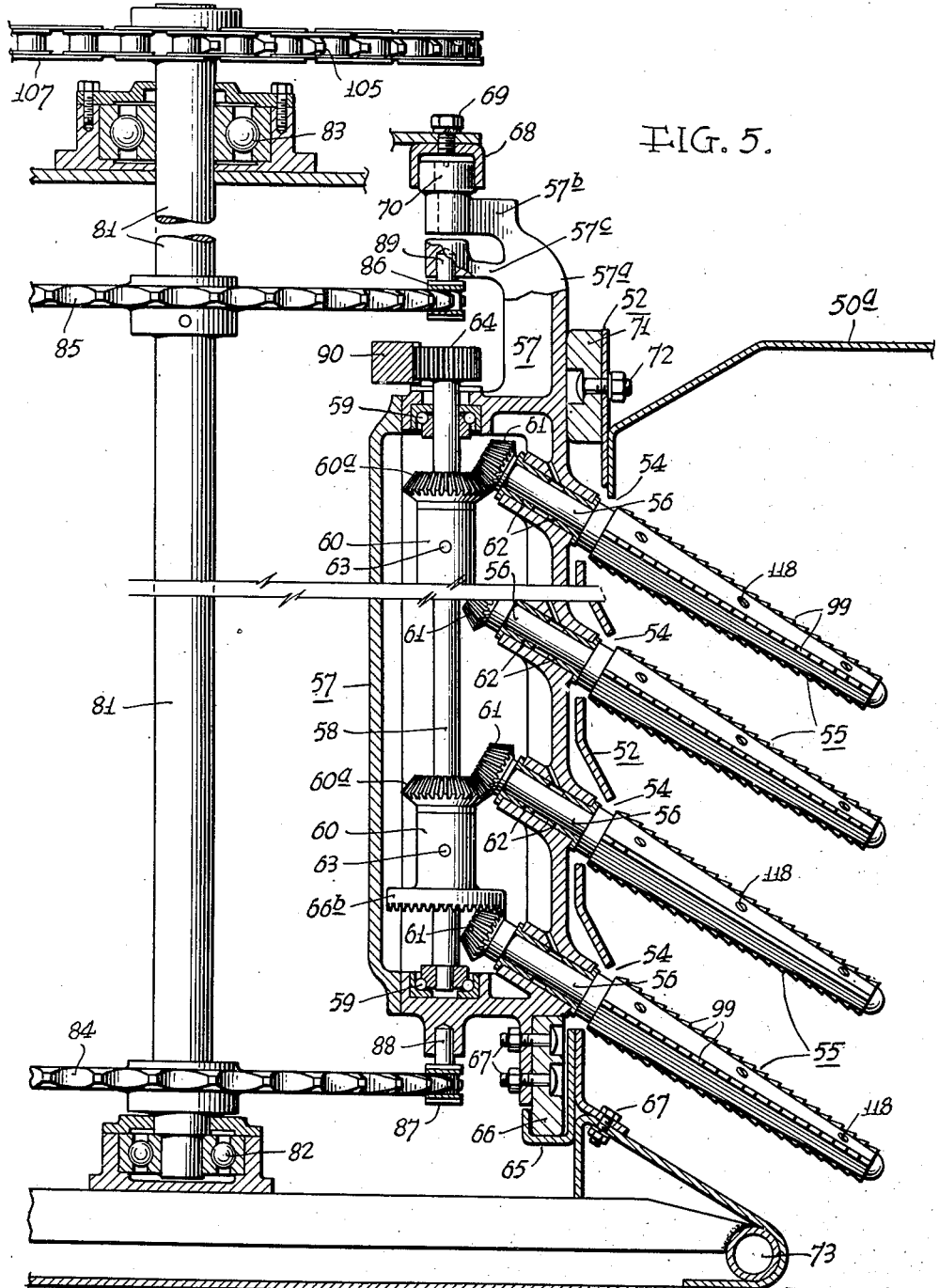
Fig. 5 is an enlarged sectional detail as seen at 5—5 of Fig. 4.

The tunnel sides formed by guards 51 and 52 are provided with a plurality of horizontal slits 54, 54 through which the picking fingers 55, 55 protrude as shown in Figs. 4 and 5. Since the fingers tilt downwardly, slits 54 likewise curve downwardly at the forward and rear termini thereof to provide ample clearance for finger movement.

The tunnel roof 50a together with the tunnel sides 51 and 52 prevent dust and foreign matter from reaching the working parts of the picker. Furthermore, it will be understood that the tunnel sides 51 and 52 are interchangeable.

The fingers 55 are mounted on rotatable spindles 56 (Fig. 5) journaled in a vertical carrier 57. In the embodiment described herein, there are eight fingers in each carrier disposed one above the other, but it will be understood that any proper number may be utilized. Each carrier 57 also mounts a vertical spindle drive shaft 58 in bearings 59, 59. Shaft 58 carries a plurality of compound gear members 60, 60 having a beveled gear 60a at one end thereof and a crown gear 60b at the other end thereof. Since the spindles 56 are mounted in carrier 57 at an angle, the bevel gears 60a are designed to mesh with the under sides of alternate beveled gears 61, 61 on spindles 56. The crown gears 60b are adapted to mesh with the top of gears 61, it being understood that the compound gear 60 is mounted between pairs of spindles 56, thus providing for counter-rotation of adjacent spindles and fingers. This counter-rotation has been found to greatly increase the picking efficiency since the bolls are not brushed over but are retained in a substantially upright position until the bolls have been thoroughly cleaned.

The spindles 56 are mounted in bushings 62 in the carrier and the compound gears 60 are pinned to shaft 58 at 63. Shaft 58 carries at its upper extremity a pinion gear 64 through which the shaft is intermittently driven in a manner to be described hereinafter. The carriers 57 are supported along the tunnel walls by means of a guide 65 adapted to engage blocks 66 bolted to the carrier base at 67, 67. At the top of each carrier, lateral positioning is achieved by means of a channel member 68 attached to the frame by bolts 69 and adapted to receive a guide roller 70 at the top of the carrier. An upper guide plate 71 attached to the tunnel wall by bolt 72 serves to assist in lateral positioning of the carriers as they move along the outside of the tunnel walls 51 and 52.

If desired, the base of tunnel 50 may be restricted by oppositely disposed extensions 73 and 74 carried by the frame, the extensions serving to guide the cotton plants into the tunnel and in engagement with the fingers.

Referring now to Figs. 4 and 5, the carriers together with the fingers are adapted to revolve about a pair of vertically disposed driving shafts 80 and 81 journaled in the frame by bearings 82 and 83. Each shaft carries lower sprockets 84 and 84' and upper sprockets 85 and 85'. An upper roller chain 86 is carried by upper sprockets 85, 85' and a lower roller chain 87 is carried by lower sprockets 84 and 84'. The carriers 57 are mounted on chains 86 and 87 by means of pins 88 and 89 attached to chains 87 and 86 respectively. Pivotal movement of the carriers on pins 88 and 89 about a vertical axis is provided and it is this pivotal movement which enables the fingers 55 to be substantially retracted during the return travel along the outside of the picker.

Referring now to Fig. 4, it will be noted that the upper portion 57a of each carrier is bifurcated to form a relatively long arm 57b and a short arm 57c. Arms 57c engage pins 89 and mount the carriers on chain 86. The center of each pin 89 is in line with the axis of shaft 58 as well as lower pin 88 as shown in Fig. 5. Pivoting of the carrier assemblies on pins 88 and 89 is effected through arms 57b and rollers 70 which run in a channel or cam 68. Where the fingers extend through slots 54 in tunnel 50, the fingers are positioned at right angles to the center line of the tunnel. This is achieved by locating channel 68 in such a position that the rollers 70 are substantially over chain 86 along the inside length of chain as the fingers progress towards the rear of the tunnel. It will be noted that channel 68 has a sharper radius than sprocket 85' in order to pivot the carriers on pins 88 and 89 to maintain the fingers in the tunnel in a nearly transverse position. Channel 68 continues with a shorter radius than sprocket 85' so that as the fingers and carriers progress around sprocket 85' the axes of the spindles 56 are biased backwardly with respect to the pins 88 and 89. This positioning of the carriers continues along the return travel of the chains so that the fingers are pivoted to the relatively closely spaced inoperative position shown in Fig. 4. The configuration of channel 68 at the forward end is such that the carriers are pivoted on the carrier pins 88 and 89 to present the fingers normally into tunnel 50 as they enter slots 54. To enable this result to be achieved, channel 68 extends outwardly beyond sprocket 85 at the forward end. The above described pivoting of the carriers which not only retracts the fingers on the return travel but enables them to be presented at right angles to the tunnel at all times, is very effective in increasing the picking efficiency of the machine.

Rotation of the individual fingers 55 is limited to less than one-half of the total carrier travel. This feature also reduces the power required to drive the picker and eliminates unnecessary wear. A rack 90 is mounted directly underneath sprockets 85 and 85' and is so positioned that pinion 64 is adapted to be driven by the rack 90 when each carrier arrives at the beginning 90a of the rack. The rack follows the curvature of rear sprocket 85' and terminates at 90b to stop further rotation of the fingers when these have been withdrawn from the tunnel 50.

In order to provide positive smooth initial engagement of pinion 64 and rack 90, a rubber bumper 91 (Fig. 11) is secured to the beginning 90a of rack 90 by means of screw 92. A pair of spring fingers 93 and 94 which are spaced from each other a distance corresponding to the pitch of the teeth in rack 90 are interposed between bumper 91 and the first tooth of the rack. Springs 93 and 94 are also secured to the rack by means of screw 92. The resilient bumper together with the resiliency of springs 93 and 94 readily serves to align the teeth of pinion 64 so that engagement with the rack is accomplished without clashing of gear teeth.

It will be understood that the construction of Fig. 4 applies to each set of fingers, there being a similar assembly on either side of tunnel 50; the fingers in both sets, however, running from front to back over the sprockets and the showing at the left hand side of the tunnel 50 would merely be the reverse of Fig. 4.

The drive for both sets of sprockets is provided through the uppermost driven sprockets 105 and 105' mounted on shafts 81 and 81' for each finger assembly. Sprockets 105 and 105' are in turn driven from small sprockets 106 and 106' by chains 107 and 107' as shown in Fig. 2. Gearing boxes 108 and 108' carry sprockets 106 and 106' and serve to transmit driving force from engine 25 to the sprockets through the driven member 109 of clutch 40, belt 41 and shafts 111 and 111'.

Referring now to Figs. 7–10, the construction of the individual fingers 55 will be more fully described.

Each finger comprises a tapered base member 55a of generally square cross section. Opposite faces of the finger proper 55a are channeled to receive tapered keys 115, 115 which serve to retain blades 116, 116 in the member 55a. The blades 116 extend diagonally at each corner of member 55a and have extrusions 117, 117 extending alternately on each side of the blade which serve to lock the blades securely in the members 55a. Each blade is provided with buttress-shaped teeth 99 as shown in Fig. 8 which facilitate the wiping action of doffers 95 and 96. The blades, as well as the keys 115, are retained in members 55a by means of screws 118 and it will be apparent that this construction permits quick blade replacement in the field without the necessity of installing entirely new fingers as is current practice.

A modified form of finger without the removable blade feature is illustrated in Fig. 10 which shows a tapered finger 55b of generally square cross section having along each corner thereof a plurality of teeth 99' of similar buttress form. The finger of Fig. 10 provides generally satisfactory operation and is less expensive to manufacture but is not suitable for service where frequent replacement is required.

Having chosen the barbed rotating-finger method of removing the cotton from its parent plant, I realize that this method has been used by others. However, many have found it necessary to dampen the picking fingers to secure sufficient adherence of the cotton, while others have used excessively sharp barbs from which the lint is not readily stripped. These difficulties have been obviated by using spindles of rather large size, spaced closely enough both horizontally and vertically to contact any opened cotton boll of normal size, and rotating these fingers at moderate speed. To increase the probability of encountering the greatest possible number of opened bolls, I have inclined the fingers downwardly toward their tips, as cotton bolls rarely hang straight down, but rather incline downward and outwardly from the plant. This slope therefore brings the finger in contact with the lint in the most favorable position to ensure its wrapping about the finger and being withdrawn from the boll. Moreover, since the closeness of spacing in the horizontal direction is limited by the necessary working clearance between adjacent finger carriers, it is advisable to arrange the motions of the machine so that the fingers travel rearwardly along the tunnel, not precisely at the same speed as the rate of progress of the entire machine over the ground, but at a slightly different rate, so that the fingers travel longitudinally through the plant about the same distance as the horizontal spacing of the fingers during their contact with the plant.

To simplify the problem of removing the lint from the fingers after picking, I have arranged to cause rotation of the fingers to cease as soon as they have been withdrawn from the plant, and before they come in contact with the doffers. Since the fiber is not wound with excessive tightness about the fingers, it is readily slid off the free ends of the fingers by a relatively light rubbing contact. An air blast entering a collector pipe is adequate provision to ensure that the picked cotton will not accumulate in inaccessible locations inside the machine.

A method of setting the fingers to rotating has tended to discourage many from stopping the fingers at any point of the picking cycle. The use of a friction drive, using a resilient material to contact the pinion teeth, offers a simple solution to this problem, while the spring teeth next encountered by the finger-driving pinions presents a means for ensuring accurate mesh when the rigid teeth of the driving rack are encountered.

The closed-path cam or channel which determines the angle at which the fingers stand with respect to the carrier chains, makes possible entry of the fingers into the cotton endwise, instead of with a sweeping motion, minimizing twig breakage; and disengagement is achieved in the same manner. Likewise, the fingers may be kept substantially normal to the doffer strips during doffing. Finally, during the idle travel of the finger carriers back to the front of the machine, they may be positioned at a substantial angle to a fore-and-aft line, so as to occupy a minimum of width, which space is at a premium on account of the close row spacing sometimes followed in planting cotton. At the front of the machine, the finger carriers must swing through a large angle in a short time, but the cam may readily be proportioned to make the acceleration moderate and smooth.

It is desirable that lubrication be supplied to all working parts, and this may well be provided by drip-feed lubricators adapted to apply lubricant to each spindle carrier as it passes, entering through a felt filter at the top, entering the housing, and running down the vertical shaft, being distributed therefrom by centrifugal force.

I claim:

1. In cotton picking apparatus, a picker finger comprising a body of polygonal form having grooves along each corner thereof, narrow toothed strips detachably retained in said grooves and having effectively thickened portions along the edge opposite the teeth, and clamping means for securing the strips in said grooves.

2. A cotton picking finger for cotton pickers, comprising an assembly including a tapered finger body having a generally polygonal transverse cross-section and an axial groove at each apex thereof, a removable blade in each of said grooves, and means engaging the blades for retaining said blades in the grooves.

3. Apparatus in accordance with claim 2, in which the blades have unidirectional pointing teeth.

4. Apparatus in accordance with claim 2, in which the blades have lateral offsets adapted to cooperate with an undercut portion of the grooves for retaining the blades therein.

5. Apparatus in accordance with claim 2, in which the means for retaining the blades to the fingers comprises a detachable tapered plate.

THOMAS M. SEARLES.

REFERENCES CITED

The following references are of record in the file of this patent:

UNITED STATES PATENTS

| Number | Name | Date |
|---|---|---|
| 685,442 | Campbell | Oct. 29, 1901 |
| 840,367 | Piper | Jan. 1, 1907 |
| 955,594 | Houghton | Apr. 19, 1910 |
| 1,184,795 | Volkman | May 30, 1916 |
| 1,824,223 | Meyercord et al. | Sept. 22, 1931 |
| 1,901,686 | Wirth | Mar. 14, 1933 |
| 2,023,491 | Rust et al. | Dec. 10, 1935 |
| 2,140,631 | Johnston | Dec. 20, 1938 |
| 2,247,686 | Johnston | July 1, 1941 |